(12) United States Patent
Hartnett et al.

(10) Patent No.: US 11,300,147 B2
(45) Date of Patent: Apr. 12, 2022

(54) SLEEVES FOR INTERFERENCE FASTENERS

(71) Applicant: Roller Bearing Company of America, Inc., Oxford, CT (US)

(72) Inventors: Michael J. Hartnett, Palm Beach, FL (US); Curtis M. Swartley, Torrington, CT (US); Charles Houle, Thomaston, CT (US); Phil Smith, Harwinton, CT (US); Giovanni C. Albini, Watertown, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 289 days.

(21) Appl. No.: 16/456,654

(22) Filed: Jun. 28, 2019

(65) Prior Publication Data

US 2020/0011360 A1 Jan. 9, 2020

Related U.S. Application Data

(60) Provisional application No. 62/693,611, filed on Jul. 3, 2018.

(51) Int. Cl.
*F16B 19/02* (2006.01)
*F16B 4/00* (2006.01)

(52) U.S. Cl.
CPC ............. *F16B 19/02* (2013.01); *F16B 4/004* (2013.01)

(58) Field of Classification Search
CPC .......... F16B 4/004; F16B 5/02; F16B 13/065; F16B 13/066; F16B 13/0858; F16B 13/124; F16B 13/126; F16B 19/02; F16B 19/1081; E21D 21/008
USPC ................................ 411/44, 60.1, 65, 69, 71
See application file for complete search history.

(56) References Cited

U.S. PATENT DOCUMENTS

| | | | | |
|---|---|---|---|---|
| 2,102,230 A | * | 12/1937 | Waterman | F16B 13/066 411/41 |
| 2,353,851 A | * | 7/1944 | Rosan | F16B 13/126 411/80.2 |
| 2,931,412 A | * | 4/1960 | Wing | F16B 9/056 411/108 |
| 2,955,504 A | * | 10/1960 | Lovrinch | F16B 13/066 411/51 |
| 3,085,463 A | | 4/1963 | Hallock | |
| 3,174,523 A | * | 3/1965 | Hult | F16B 5/02 411/103 |
| 3,203,451 A | | 8/1965 | Vincent | |
| 3,211,044 A | * | 10/1965 | White | E21D 21/008 411/80.5 |
| 3,375,670 A | * | 4/1968 | Serota | E02D 5/54 405/244 |

(Continued)

FOREIGN PATENT DOCUMENTS

| EP | 0937900 A2 | 8/1999 |
|---|---|---|
| EP | 1990555 B1 | 11/2011 |

(Continued)

OTHER PUBLICATIONS

Extended European Search Report issued in corresponding EP Application No. 19183801.0, dated Nov. 5, 2019, pp. 1-8.

*Primary Examiner* — Roberta S Delisle
(74) *Attorney, Agent, or Firm* — Murtha Cullina LLP

(57) ABSTRACT

An expandable sleeve for an interference fastener has a hollow elongate stem extending axially between an insertion end and a head portion. The elongate stem has an inside surface and an outside surface. A portion of the stem has a fluted shape and/or has a cylindrical shape with a conical portion.

23 Claims, 24 Drawing Sheets

(56) References Cited

U.S. PATENT DOCUMENTS

| | | | |
|---|---|---|---|
| 3,412,565 A | 11/1968 | Lindsey et al. | |
| 3,444,959 A | 5/1969 | Mansfield et al. | |
| 3,555,960 A * | 1/1971 | White | F16B 13/065 411/80.5 |
| 3,667,341 A * | 6/1972 | Kaplan | F16B 13/065 411/60.1 |
| 3,742,809 A * | 7/1973 | Zifferer | F16B 13/124 411/61 |
| 3,921,280 A | 11/1975 | King, Jr. | |
| 4,097,168 A * | 6/1978 | Pagel | F16B 4/004 403/388 |
| 4,102,030 A | 7/1978 | King, Jr. | |
| 4,274,460 A | 6/1981 | Egner | |
| 9,447,809 B2 | 9/2016 | Regnard et al. | |
| 2014/0219744 A1 | 8/2014 | Heeter | |
| 2014/0271030 A1 | 9/2014 | Yamaguchi | |
| 2016/0097418 A1 | 4/2016 | March et al. | |
| 2017/0211606 A1 | 6/2017 | Haylock et al. | |
| 2017/0284449 A1 | 10/2017 | Greegor et al. | |

FOREIGN PATENT DOCUMENTS

| | | |
|---|---|---|
| EP | 3431704 A1 | 1/2019 |
| WO | 9627744 | 9/1996 |
| WO | 2011050040 A1 | 4/2011 |

* cited by examiner

SLEEVES FOR INTERFERENCE FASTENERS

CROSS REFERENCE TO RELATED APPLICATIONS

This application claims the benefit of U.S. Provisional Patent Application Ser. No. 62/693,611 filed on Jul. 3, 2018, which is incorporated herein by reference in its entirety.

FIELD OF THE INVENTION

The present invention relates generally to sleeves for use in interference fasteners for various substrates (e.g., metallic, plastic, and composite substrates) and more particularly to sleeves with stress reduction features configured to reduce damage to a bore of a substrate that the sleeve is installed in. Such stress reduction features include a sleeve with a stem having a fluted shape and a sleeve having a substantially cylindrical shape with a conical tapered section.

BACKGROUND OF THE INVENTION

Interference fit fastener systems generally include a sleeve for insertion into a bore of a substrate and a bolt that extends through the sleeve and bore. A force is applied to the bolt to draw the bolt into the sleeve thereby expanding the sleeve in an interference fit in the bore. The prior art sleeves typically have a cylindrical cross section which has a diameter comparable to an inside diameter of the bore. Thus, it is difficult to install the sleeve in the bore. Insertion of the prior art sleeves into the bores is known to cause damage to the interior surface of the bore due to high contact stresses applied to the sleeve. Some prior art sleeves employed a lubricant on the interior surface of the sleeve, exterior surface of the bolt, or both to reduce friction associated with insertion of the sleeve into the bore. However, use of such lubricants adds to the cost and complicates quality control of the sleeves. In addition, the prior art sleeves are cylindrical essentially over the entire axial length of the sleeve and subject the entry portion of the bore to high stress concentrations that can damage the interior surface of the bore Thus, there is a need for an improved sleeve for interference fasteners.

SUMMARY

There is disclosed herein, an expandable sleeve for an interference fastener. The sleeve includes a hollow elongate stem that extends axially between an insertion end and a head portion of the sleeve. The elongate stem has an inside surface and an outside surface. The stem and/or the head portion are manufactured from a metallic material. The stem has fluted shape on all or a portion thereof. The stem is deformable to establish an interference fit in a bore formed in a substrate such as a housing made of a composite material.

In one embodiment, the fluted shape includes: (a) the outside surface being fitted within a first reference circle, at least a portion of first axial cross section intersecting the first reference circle and at least a portion of the first axial cross section being spaced apart from the first reference circle; and/or (b) the inside surface being fitted around a second reference circle, at least a portion of second axial cross section intersecting the second reference circle and at least a portion of the second axial cross section being spaced apart from the second reference circle.

In one embodiment, (a) the outside surface has a first arc length that is greater than a first circumference of the first reference circle; and/or (b) the inside surface has a second arc length that is greater than a second circumference of the second reference circle.

In one embodiment, all or a portion of the outside surface, the inside surface and/or the fluted shape is polygon shaped.

In one embodiment, all or a portion of the outside surface, the inside surface and/or the fluted shape has an arcuate wavy form.

In one embodiment, all or a portion of the outside surface, the inside surface and/or the stem is circular in shape.

In one embodiment, the stem has an overall axial length of up to 10 percent of the overall axial length of at least one of the outside surface, the inside surface and/or the stem has a circular shape.

In one embodiment, the sleeve has an overall axial length of up to 5 percent of the overall axial length of at least one of the outside surface, the inside surface and/or the stem has a circular shape.

In one embodiment, the circular shape extends from the insertion end and/or the head portion and/or the circular shape is located between the insertion end and the head portion.

In one embodiment, the outside surface has a radially inward taper extending axially toward the insertion end.

In one embodiment, the inside surface, the outside surface and/or the stem has a radially outward taper extending axially toward the head portion.

In one embodiment, the head portion has a flange extending radially outward from the stem, for example a flat shaped head or a tapered conical shape.

In one embodiment, the sleeve is manufactured from an electrically conductive material, such as a stainless steel alloy.

In one embodiment, the stem has a uniform cross sectional thickness.

There is disclosed herein an expandable sleeve for an interference fastener that includes a hollow elongate stem that extends axially between an insertion end and a head portion. The elongate stem has an inside surface and an outside surface and an overall axial length. The stem and/or the head portion are manufactured from a metallic material. A portion of the stem has a fluted shape and the stem has a cylindrical portion proximate to and extending axially toward the head portion. The stem is deformable to establish an interference fit in a bore formed in a substrate such as a housing made of a composite material. In one embodiment, the cylindrical portion has a length that is 5 to 10 percent of an overall axial length of the stem.

There is further disclosed herein an expandable sleeve for an interference fastener that includes a hollow elongate stem that extends axially between an insertion end and a head portion. The elongate stem has an inside surface and an outside surface. The stem and/or the head portion are manufactured from a metallic material. The stem includes stress minimizing means for uniformly distributing pressures when the sleeve is expanded in a bore of a substrate. The stem is deformable to establish an interference fit in a bore formed in a substrate such as a housing made of a composite material. The stress minimizing means include, for example, a fluted shape on a portion of the stem, a cylindrical shape on a portion of the stem proximate to and extending axially toward the head portion, and a conical taper on a portion of the stem proximate to and extending axially toward the head portion. The stress minimizing means prevents fracture of the sleeve when the sleeve is expanded in a bore of a substrate.

There is further disclosed herein an expandable sleeve for an interference fastener that includes a hollow elongate stem extending axially between an insertion end and a head portion. The elongate stem has an inside surface and an outside surface and an overall axial length. The stem and/or the head portion are manufactured from a metallic material. At least a portion of the stem has a cylindrical shape and the stem includes a radially outward conical taper proximate to and extending axially toward the head portion. In one embodiment, the conical taper has an axial length, which is about 5 to 10 percent of an overall axial length of the stem. The stem is deformable to establish an interference fit in a bore formed in a substrate such as a housing made of a composite material.

DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION OF THE PREFERRED EMBODIMENT

Figure 1:
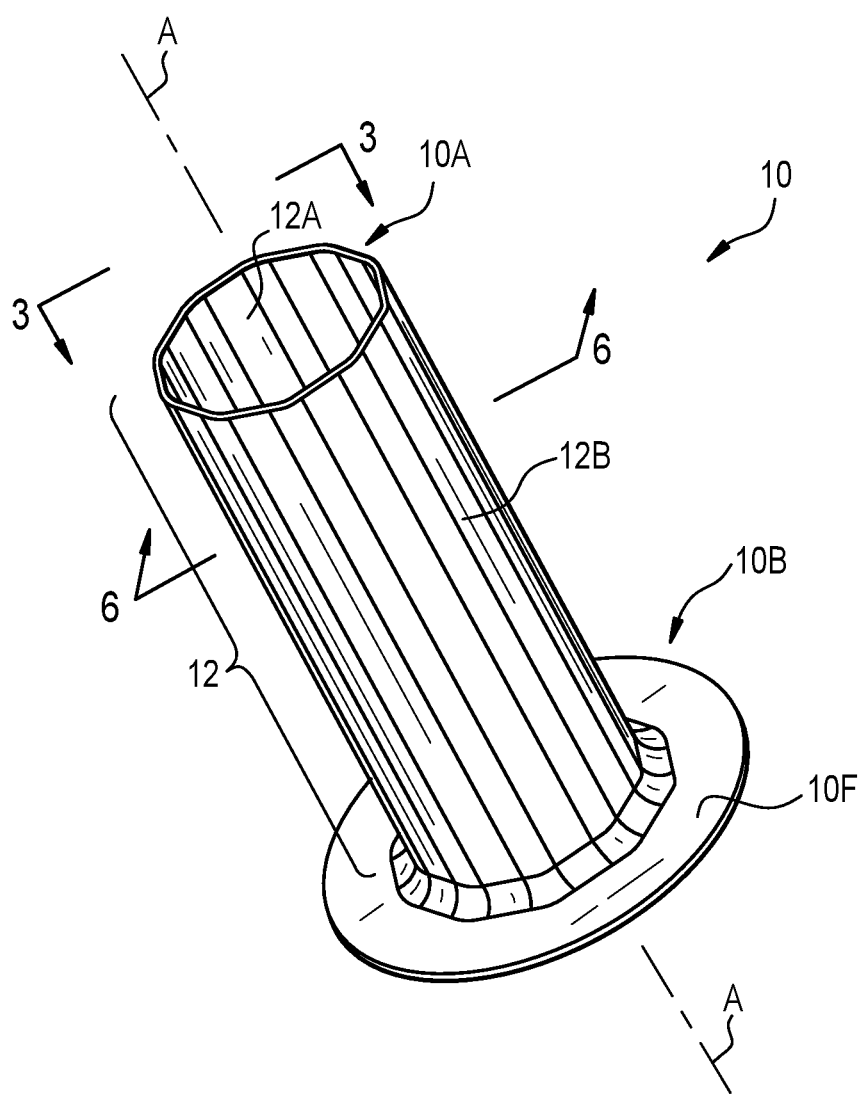
FIG. 1 is a perspective view of the fluted sleeve of the present invention.
Figure 2:
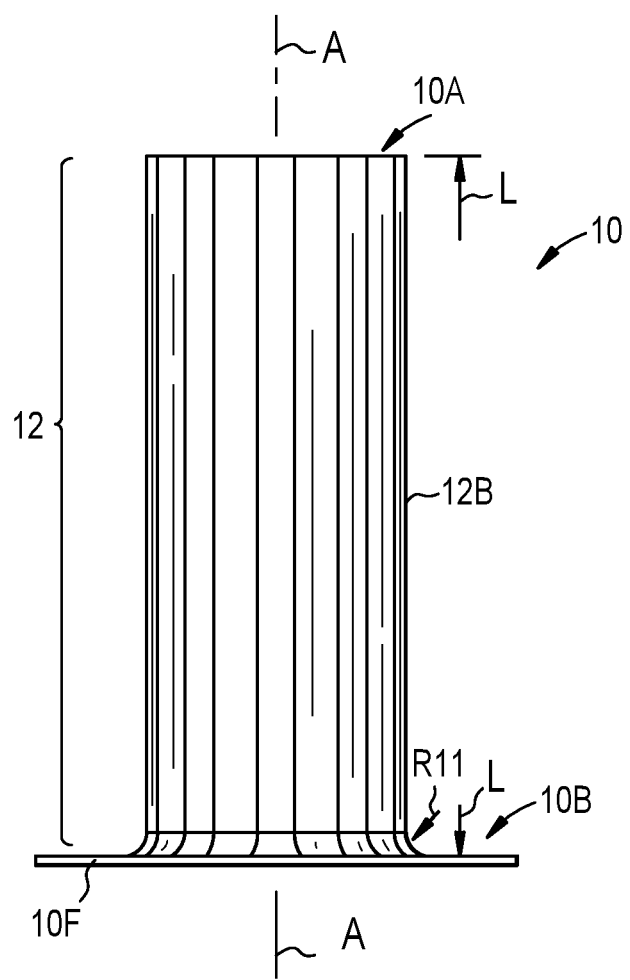
FIG. 2 is a front view of the sleeve of FIG. 1.
Figure 3:
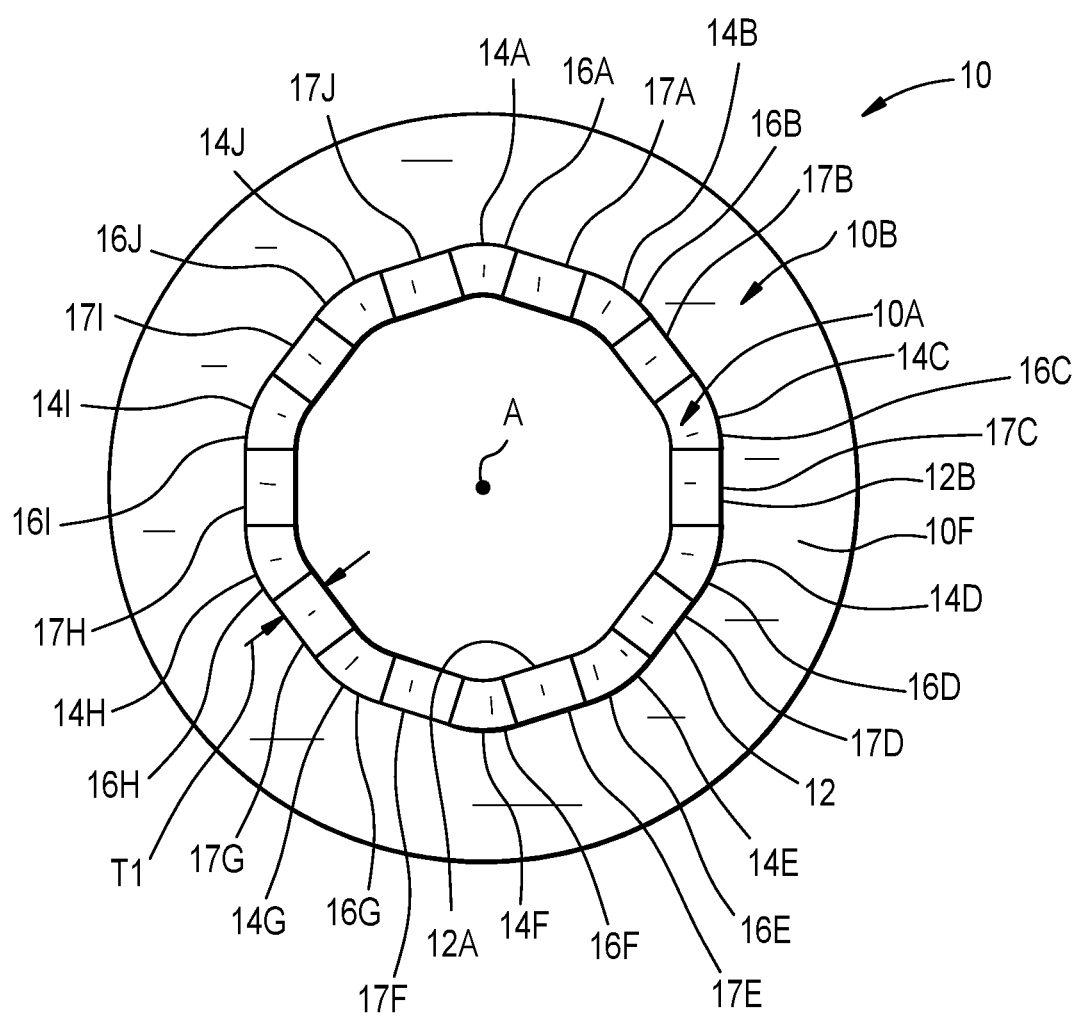
FIG. 3 is a top view of the sleeve taken from view 3-3 of FIG. 1.
Figure 4:
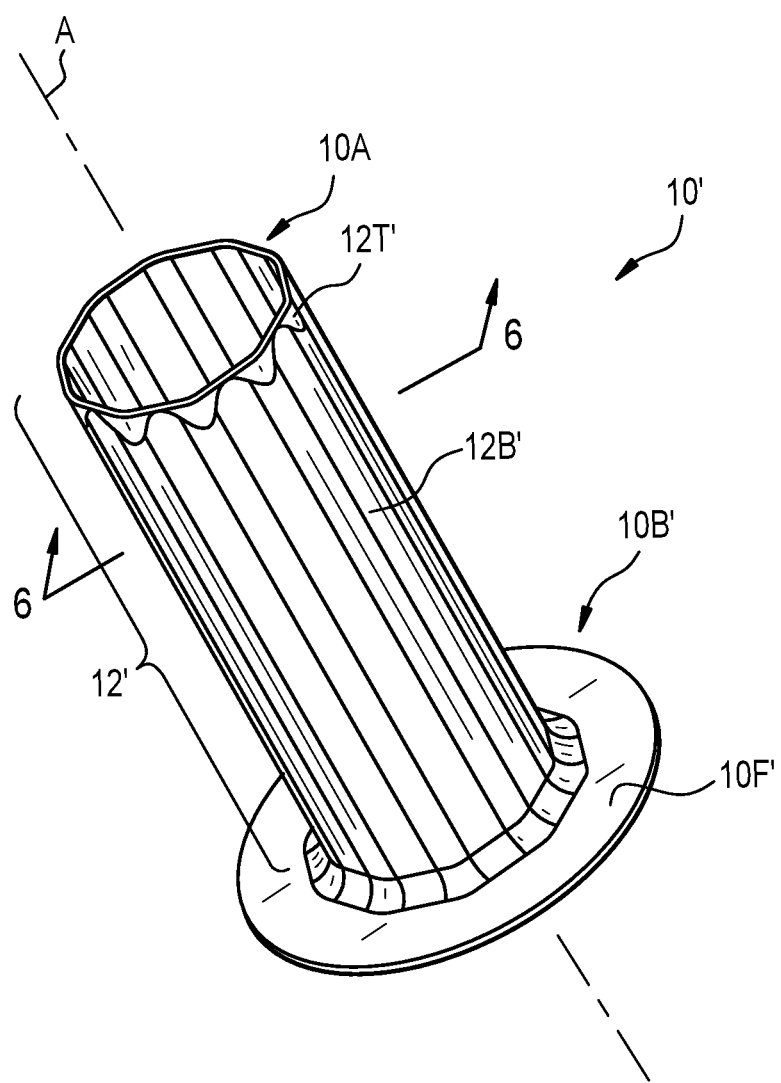
FIG. 4 is a perspective view of an embodiment of the sleeve of the present invention having a tapered end.
Figure 5:
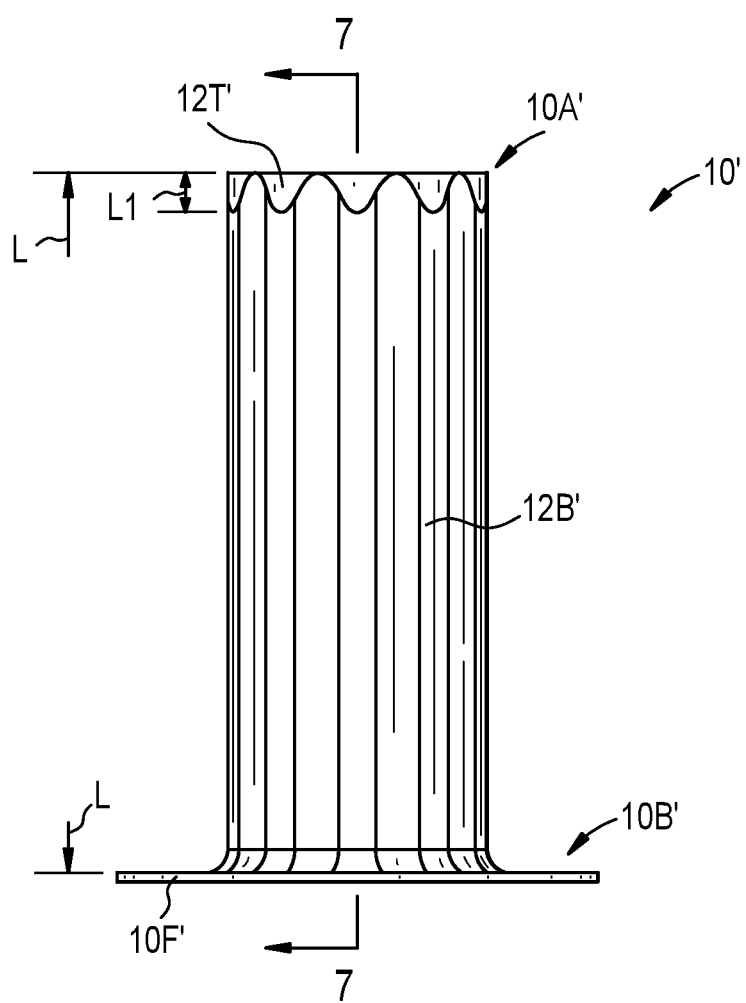
FIG. 5 is a front view of the sleeve of FIG. 4.
Figure 6A:
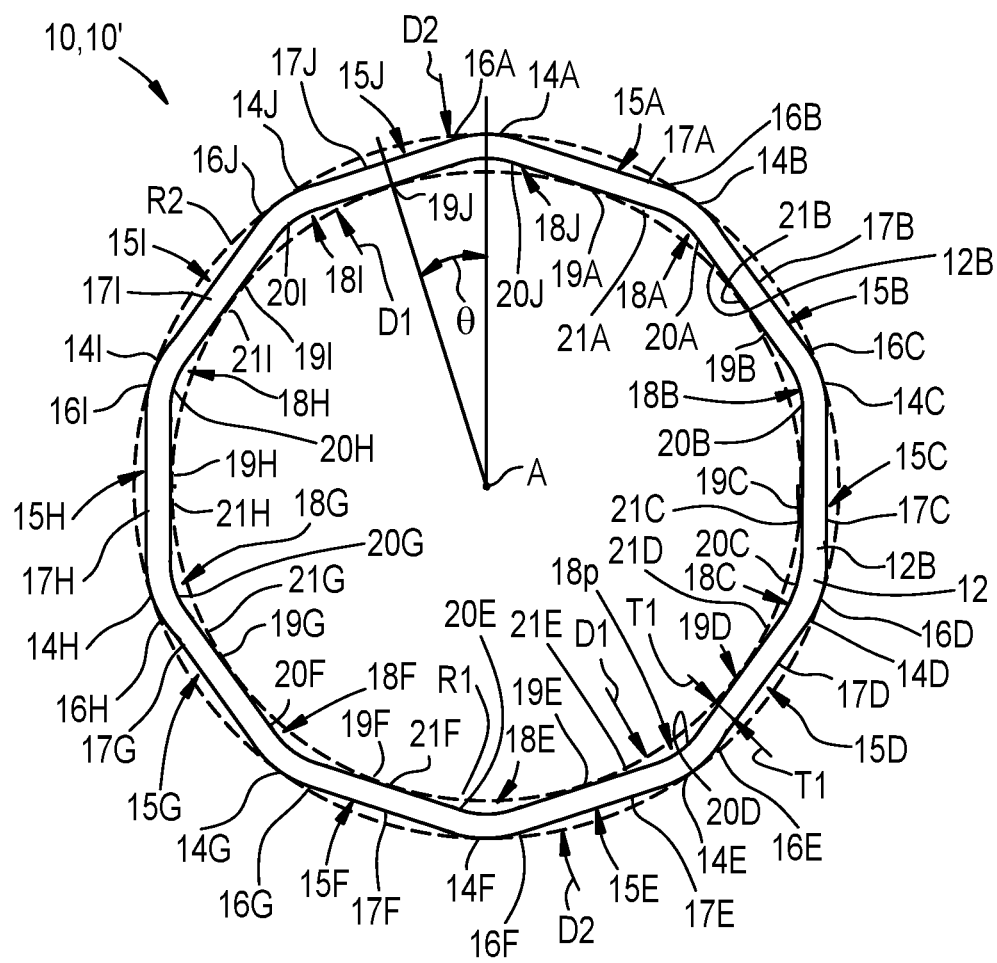
FIG. 6A is an enlarged axial cross sectional view taken across section 6-6 of FIGS. 1 and 4.
Figure 6B:
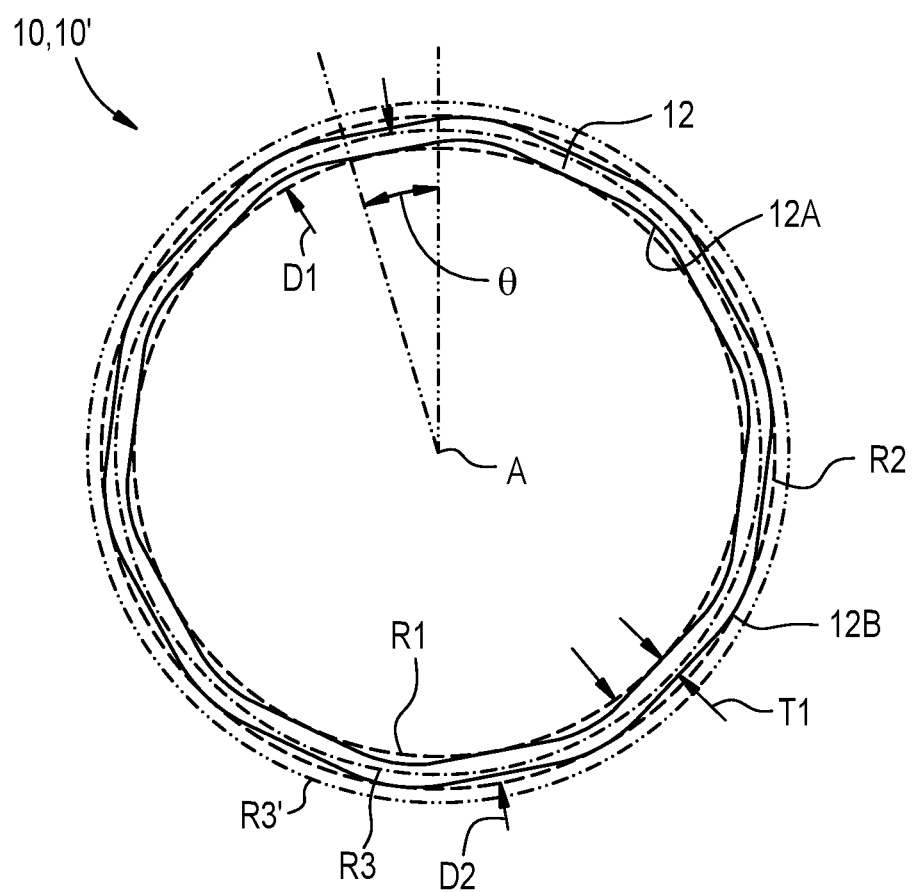
FIG. 6B is the enlarged axial cross sectional view of FIG. 6A including the third reference circle R3, R3'.

As shown in FIGS. 1-3, an expandable sleeve for an interference fastener is generally designated by the reference number 10. The sleeve 10 has a hollow elongate stem 12 extending axially parallel to a central longitudinal axis A, between an insertion end 10A and a head portion 10B. The stem 12 and the head portion 10B are manufactured from a metallic material, such as a stainless steel. The elongate stem 12 has an inside surface 12A and an outside surface 12B. At least a portion of the stem 12 has a fluted shape, as described herein. For example, as shown in FIGS. 6A and 6B, the inside surface 12A, the outside surface 12B and the stem 12 along substantially the entire axial length L of the stem 12 is polygon shaped, when viewed in the axial cross section. As shown in FIG. 2, in one embodiment, there is an arcuate radius R11 extending between and transitioning the stem 12 to the head portion 10B, on the outside surface 12B. A similar arcuate radius extends between and transitions the stem 12 to the head portion 10B, on the inside surface 12A.

Figure 18A:
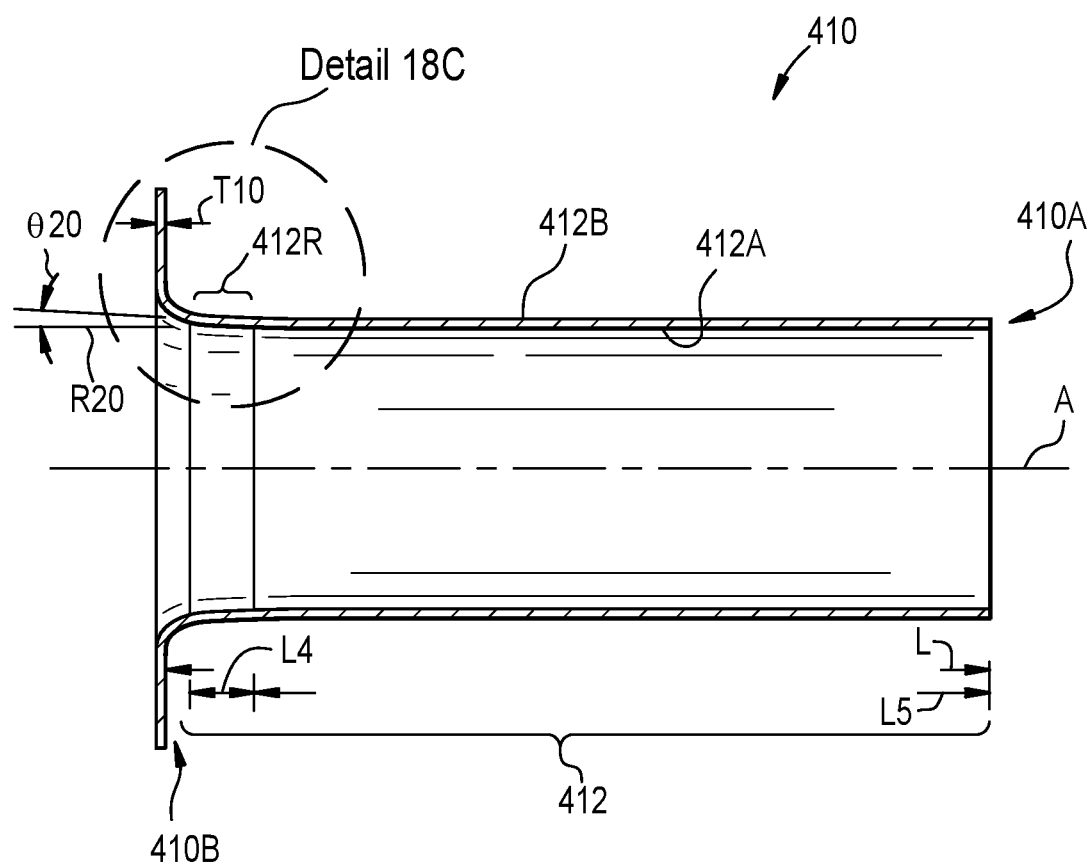
FIG. 18A is a cross sectional view of a sleeve having a substantially cylindrical stem and having a tapered section proximate the head portion.
Figure 18B:
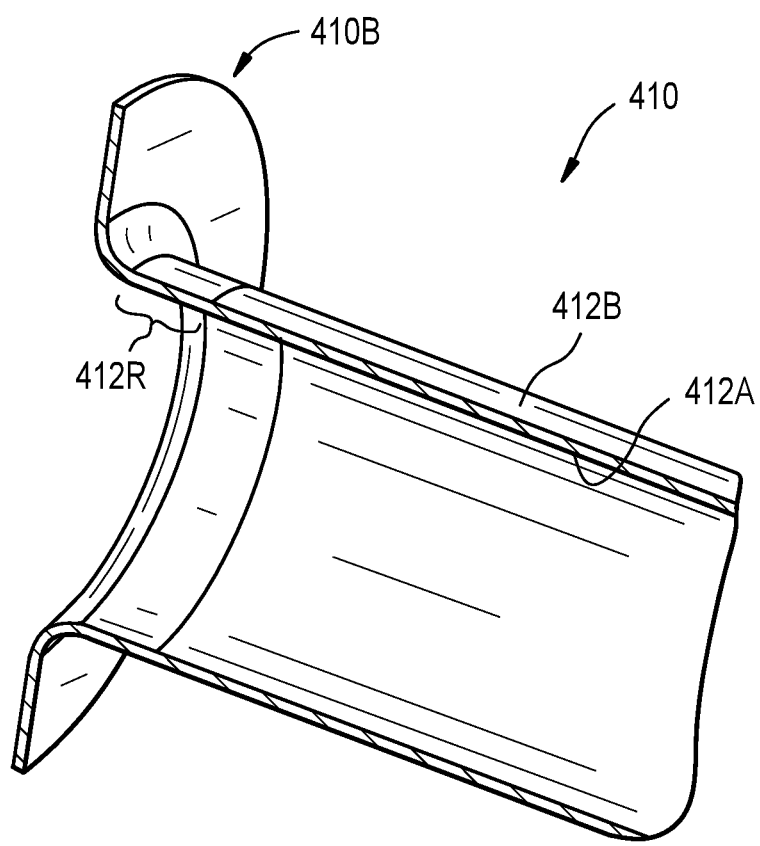
FIG. 18B is an enlarged cross sectional perspective view of a portion of the sleeve of FIG. 18A.
Figure 18C:
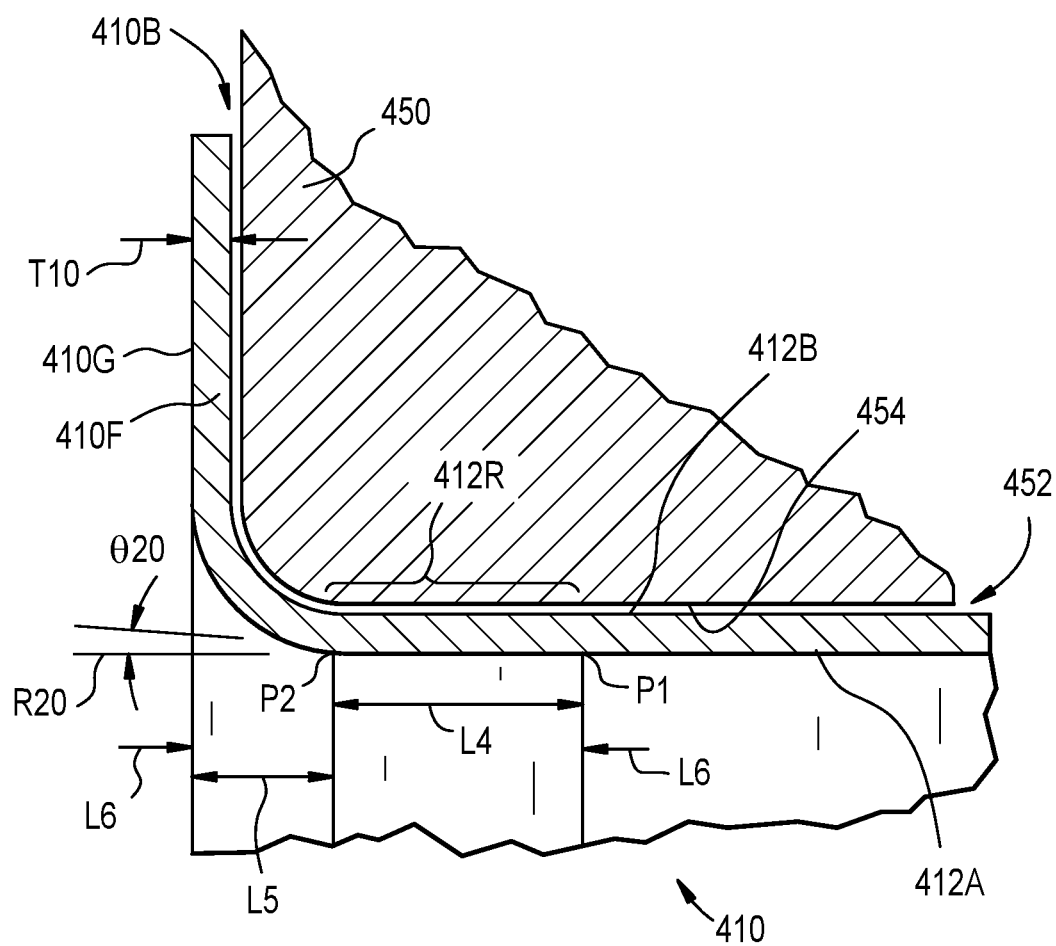
FIG. 18C is an enlarged view of detail 18C of FIG. 18A.

As shown in FIGS. 18A, 18B and 18C, the expandable sleeve 410 for an interference fastener includes a hollow elongate stem 412 extending axially between an insertion end 410A and a head portion 410B. The head portion 410B includes a flange 410F that has a thickness T10. The elongate stem 412 has an inside surface 412A, an outside surface 412B and an overall axial length L. A portion of the stem 412 has a cylindrical shape along an axial length L5 which is about 90 to 95 percent of the overall axial length L. The stem 412 includes a radially outward taper 412R (e.g., truncated conical shape) extending axially toward the head portion 412B. The taper 412R has an axial length L4, which is about 5 to 10 percent of the overall axial length L of the stem. In one embodiment, the axial length L4 is about 300 percent of the thickness T10. In one embodiment, the axial length L4 is about 250 percent to about 350 percent of the thickness T10. In one embodiment, the taper 412R extends between a point P1 and a point P2. The point P1 is located a length L6 from an axial surface 410G of the flange 410F. The point P2 is located a length L5 from the axial surface 410G of the flange 410F. In one embodiment the length L5 is about 600 percent of the thickness T10. In one embodiment the length L5 is about 550 percent to about 650 percent of the thickness T10. In one embodiment, the length L6 is about 900 percent of the thickness T10. In one embodiment, the length L6 is about 850 percent to about 950 percent of the thickness T10. The taper 412R forms an angle θ20 relative to a line R20 that is parallel to the longitudinal axis A. In one embodiment, the angle θ20 is 1 to 5 degrees and preferably 2 to 3 degrees. The taper 412R has utility in minimizing stresses applied to the substrate 450 when the sleeve 410 is radially expanded in the bore 452 and against the interior surface 454. Thus, sleeve 410 having the taper 412R allows a cylindrical shaped stem 412 to be employed and installed in the bore of the substrate 452 without lubrication and without damaging the interior surface 454 upon radial expansion of the sleeve 410, and to prevent failure of the sleeve during insertion in the bore.

The stems 12, 412 of the sleeves 10, 410, respectively, are configured as stress equalizing features for uniformly distributing pressures when the sleeve 10, 410 is expanded in a bore 52 of a substrate 50. The stems 12, 412 also minimize the stress in the sleeve 10, 410 to prevent sleeve failure during insertion. The fluted shaped stem 12 and the stem 412 having a radially outward conical taper 412R extending axially toward the head portion 410B are examples of such stress minimizing features.

Figure 13:
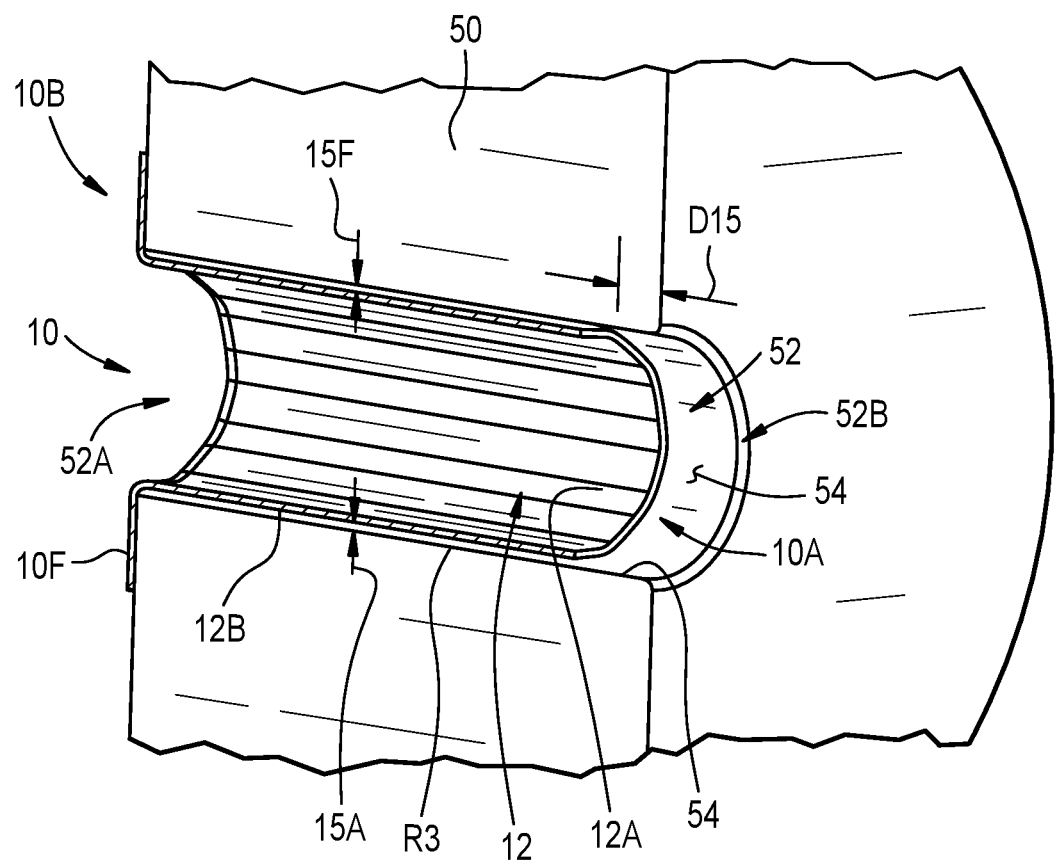
FIG. 13 is a perspective cross sectional view of the sleeve of FIG. 1 installed in a bore of a substrate.
Figure 14:
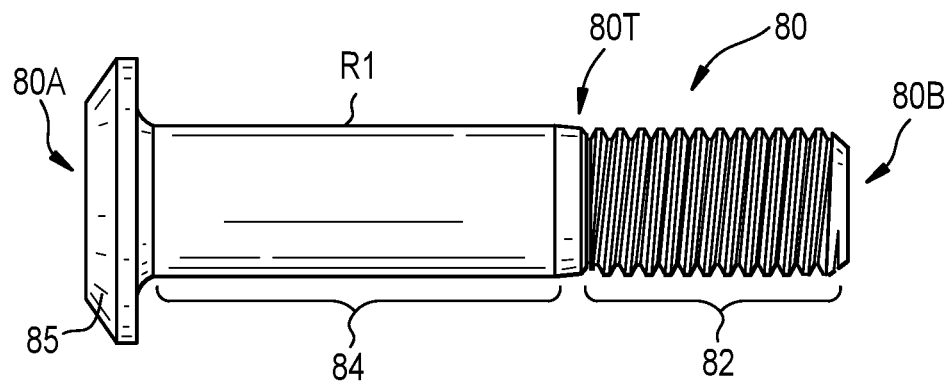
FIG. 14 is a side view of a bolt for use in expanding the sleeve of FIG. 1 in a bore of a substrate.
Figure 17:
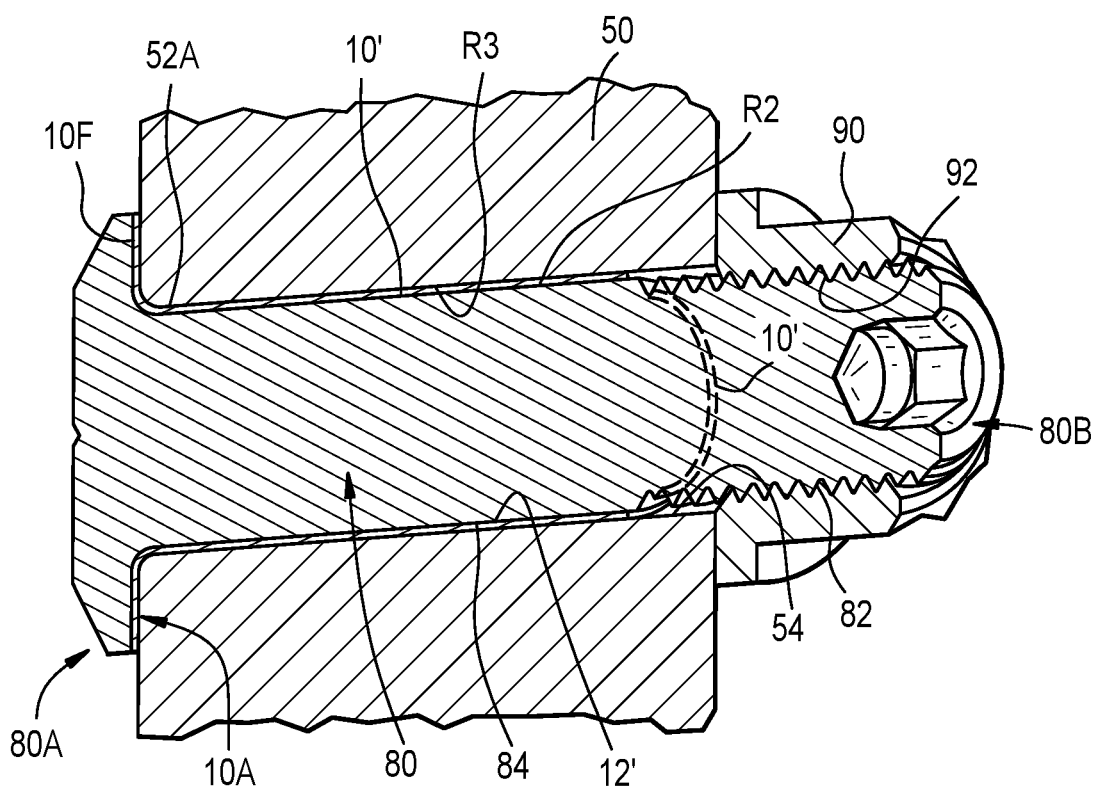
FIG. 17, is a perspective cross sectional view of the bolt of FIG. 14 installed in the sleeve of FIG. 1, with a nut secured to the bolt to expand the sleeve radially outward into the substrate.

The sleeve 10 is configured for insertion, insertion end 10A first, into a hole or bore 52 in a substrate 50 (e.g., a substrate in an aircraft such as a panel made of a composite material), as shown in FIG. 13. The sleeve 10 is radially expanded in the bore 52 against an interior surface 54 that defines the bore 52. The tightening of a nut 90 on a bolt 80 as depicted in FIGS. 14 and 17 radially expands the sleeve 10. In alternative embodiments, the sleeve 10 expands when the bolt 80 is pushed into the sleeve 10, for example a force is applied to the bolt to draw the bolt into the sleeve thereby expanding the sleeve in an interference fit in the bore.

As shown in FIGS. 6A and 6B, in one embodiment, the fluted shape of the stem 12 is shown in cross section between a first reference circle R1 and a second reference circle R2. The fluted shape of the stem 12 is defined by the outside surface 12B, shown in an axial cross sectional view. FIG. 6A illustrates that the outside surface 12B of the stem 12 is fitted within a cylindrical envelope, which in axial cross section is depicted as the second reference circle R2. Portions of the outside surface 12B, shown in the axial cross sectional view, intersect the second reference circle R2. For example in the depicted embodiment, the outside surface 12B has ten axial lines 14A, 14B, 14C, 14D, 14E, 14F, 14G, 14H, 14I and 14J of intersection (e.g., tangential contact) with the second reference circle R2. Portions of the outside surface 12B shown in the axial cross section are spaced apart from the second reference circle R2 by a gap (e.g., a crescent shaped gap). For example, the outside surface 12B is spaced apart from the second reference circle R2 at ten locations thereby forming ten gaps 15A, 15B, 15C, 15D, 15E, 15F, 15G, 15H, 15I and 15J between the outside surface 12B and the second reference circle R2.

As in FIGS. 3 and 6, the fluted shape of the stem 12 is further defined by the outside surface 12B having ten arcuate shaped lobes 16A, 16B, 16C, 16D, 16E, 16F, 16G, 16H, 16I and 16J extending longitudinally therealong. Each of the lobes has a peak that corresponds to the respective one of the lines 14A, 14B, 14C, 14D, 14E, 14F, 14G, 14H, 14I and 14J of intersection. The outside surface 12B has ten flat surfaces 17A, 17B, 17C, 17D, 17E, 17F, 17G, 17H, 17I and 17J that extend between respective adjacent pairs of the arcuate shaped lobes 16A, 16B, 16C, 16D, 16E, 16F, 16G, 16H, 16I and 16J. Center points of each of the flat surfaces 17A, 17B, 17C, 17D, 17E, 17F, 17G, 17H, 17I and 17J are angularly (e.g., circumferentially) spaced apart from and adjacent one of the lines 14A, 14B, 14C, 14D, 14E, 14F, 14G, 14H, 14I and 14J of intersection by an angle θ (e.g., 18 degrees in the depicted embodiment).

While the fluted shape of the stem 12 is shown and described as having ten of the intersecting lines 14A-J, ten of the gaps 15A-J, ten of the arcuate shaped lobes 16A-J, ten of the flat surfaces 17A-J and the center points of each of the flat surfaces 17A-J are angularly (e.g., circumferentially) spaced apart from and adjacent one of the lines 14A-14J by an angle θ of 18 degrees are shown and described, the fluted shape of present invention is not limited in this regard. The fluted shape may have any number of intersecting lines, gaps, arcuate shaped lobes and flat surfaces, equally spaced or asymmetrically spaced.

As shown in FIGS. 3 and 6, the fluted shape of the stem is further defined with regard to the inside surface 12A. For example, the depicted inside surface 12A is fitted around a reference cylinder which is depicted in axial cross section as the first reference circle R1. The first reference circle R1 has a first diameter D1 that is less than a second diameter D2 of the second reference circle R2. In one embodiment the first diameter D1 is between 90 and 95 percent of the second diameter D2. Portions of the inside surface 12A, shown in the axial cross section, are spaced apart from the first reference circle R1 by a gap (e.g., a crescent shaped gap). For example, the inside surface 12B is spaced apart from the first reference circle R1 at ten locations thereby forming ten gaps 18A, 18B, 18C, 18D, 18E, 18F, 18G, 18H, 18I and 18J between the inside surface 12A and the first reference circle R1. Portions of the inside surface 12A, shown in the axial cross sectional view, intersect the first reference circle R1. For example, the inside surface 12A has ten lines 19A, 19B, 19C, 19D, 19E, 19F, 19G, 19H, 19I and 19J of intersection (e.g., tangential contact) with the first reference circle R1.

As in FIGS. 3 and 6, the fluted shape of the stem 12 is further defined as the inside surface 12A having ten arcuate shaped valleys 20A, 20B, 20C, 20D, 20E, 20F, 20G, 20H, 20I and 20J extending longitudinally therealong. The inside surface 12A has ten flat surfaces 21A, 21B, 21C, 21D, 21E, 21F, 21G, 21H, 21I and 21J that extend between respective adjacent pairs of the arcuate shaped valleys 20A, 20B, 20C, 20D, 20E, 20F, 20G, 20H, 20I and 20J. Respective lines 19A, 19B, 19C, 19D, 19E, 19F, 19G, 19H, 19I and 19J of intersection are located on a midpoint of a corresponding flat surface 21A, 21B, 21C, 21D, 21E, 21F, 21G, 21H, 21I and 21J of the inside surface 12A.

Center points of each of the flat surfaces 21A, 21B, 21C, 21D, 21E, 21F, 21G, 21H, 21I and 21J are angularly (e.g., circumferentially) spaced apart from and adjacent one of the valleys 20A, 20B, 20C, 20D, 20E, 20F, 20G, 20H, 20I and 20J by an angle θ (e.g., 18 degrees as depicted in FIGS. 6A and 6B).

While the fluted shape of the stem 12 is shown and described as having ten of the gaps 18A-18J, ten of the lines 19A-19J of intersection, ten of the valleys 20A-20J, ten of the flat surfaces 21A-21J and the center points of each of the flat surfaces 21A-21J are angularly (e.g., circumferentially) spaced apart from and adjacent one of the valleys 20A-20J, the present invention is not limited in this regard. Any number of gaps, lines of intersection, valleys, equally spaced or asymmetrically spaced may be employed.

As shown in FIGS. 3 and 6, the stem 12 has a uniform cross sectional thickness T1 to facilitate uniform radial expansion, as described herein.

As shown in FIGS. 6A and 6B, the inside surface 12A has a first arc length defined by a rectified length of the inside surface 12A (e.g., the arc length is equal to a straight line segment corresponding to a linear extension of the inside surface). The first arc length is greater than a first circumference of the first reference circle R1. The outside surface 12B has a second arc length defined by a rectified length of the outside surface 12B (e.g., the arc length is equal to a straight line segment corresponding to a linear extension of the outside surface). The second arc length is less than a second circumference of the second reference circle R2.

As shown in FIG. 2, substantially the entire axial length L of the stem 12 has the intersecting lines 14A-J, ten of the gaps 15A-J, ten of the arcuate shaped lobes 16A-J and ten of the flat surfaces 17A-J. In one embodiment, the outside surface 12B along substantially the entire axial length L of the stem 12 is polygon shaped, when viewed in the axial cross section. In one embodiment, the inside surface 12A along substantially the entire axial length L of the stem 12 is polygon shaped, when viewed in the axial cross section.

Figure 9:
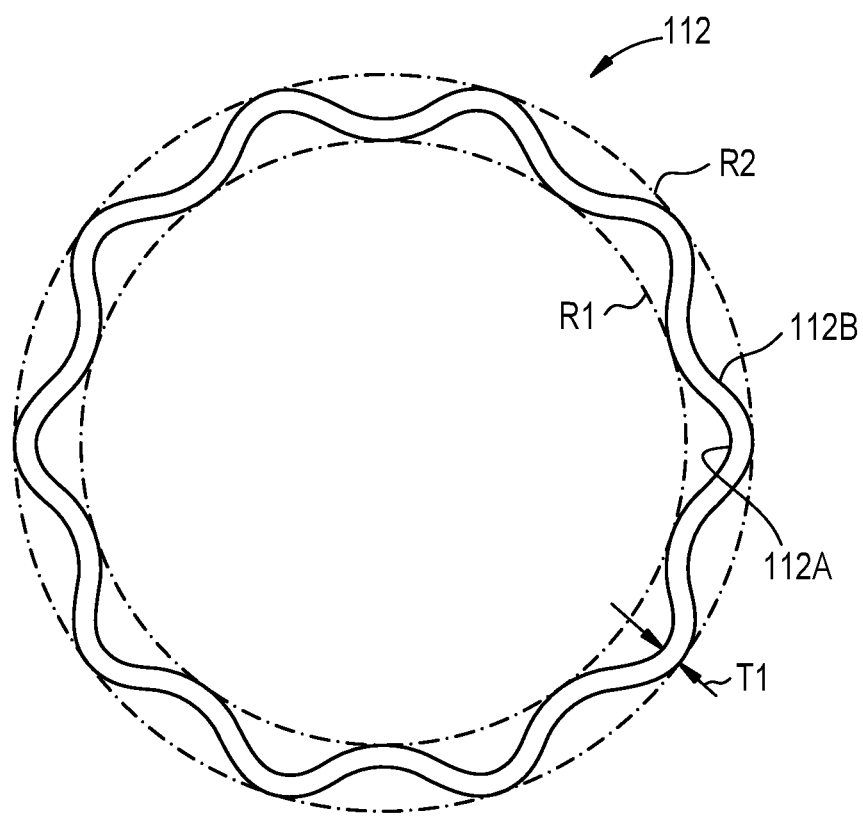
FIG. 9 is a cross sectional view of a wave type flute embodiment of the sleeve of the present invention.

As shown in FIG. 9, in one embodiment, the outside surface 112B along substantially the entire axial length L of the fluted shape of the stem 112 has an arcuate wavy form, when viewed in the axial cross section. The stem 112 has a uniform cross sectional thickness T1.

Figure 10:
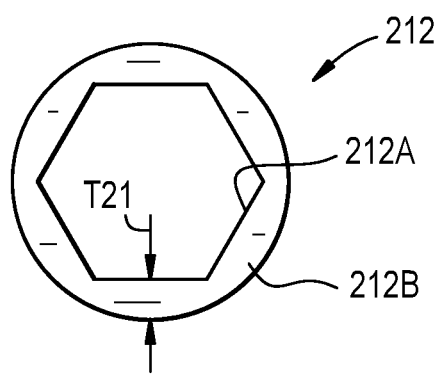
FIG. 10 is a cross sectional view of a sleeve having a non-uniform thickness.
Figure 11:
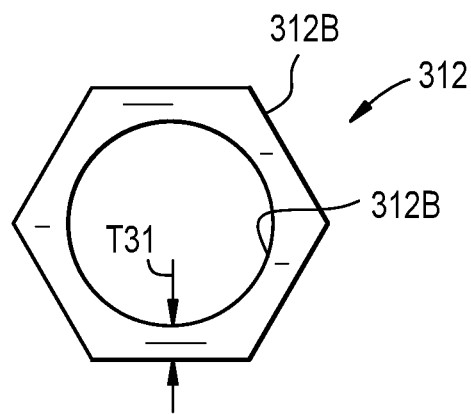
FIG. 11 is a cross sectional view of another sleeve having a non-uniform thickness.

While a uniform cross sectional thickness T1 is shown and described for the stem 12 of FIG. 3 and the stem 112 of FIG. 9, the present invention is not limited in this regard as a non-uniform thickness T21 for the stem 212 having a polygon shaped inside surface 212A, when viewed in axial cross section, and a cylindrical outside surface 212B, when viewed in axial cross section. may be employed, as shown in FIG. 10 or a non-uniform thickness T31 for the stem 312 having a cylindrical shaped inside surface 312A, when viewed in axial cross section, and an polygon shaped outside surface 312B, when viewed in axial cross section, may be employed, as shown in FIG. 11.

Figure 12A:
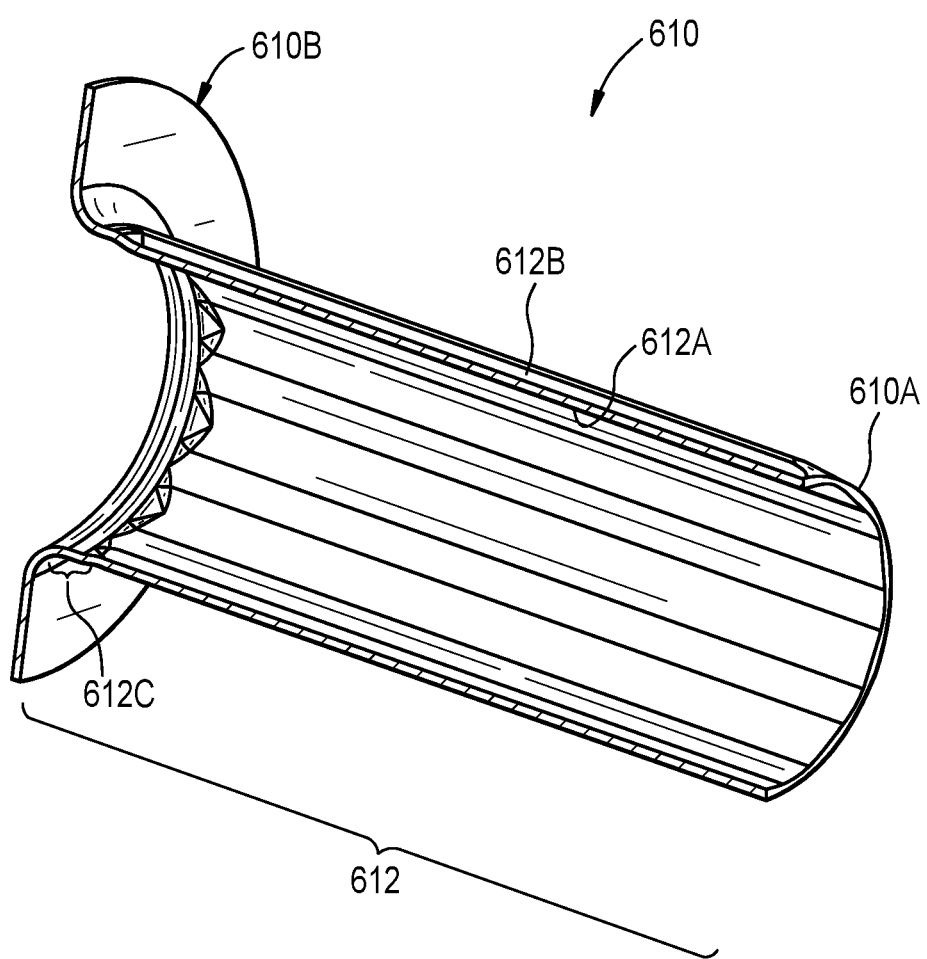
FIG. 12A is a perspective cross sectional view of an embodiment of a sleeve having a two different cross sectional shapes.
Figure 12B:
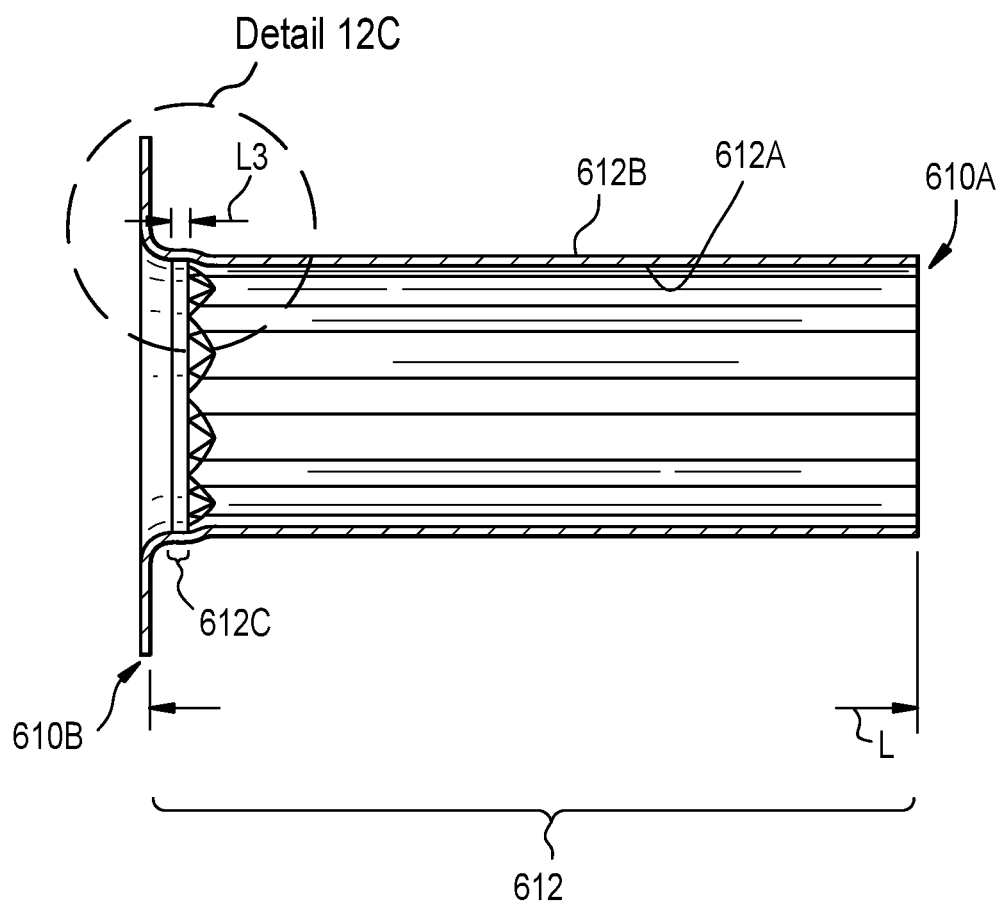
FIG. 12B is an axial cross sectional view of the sleeve of FIG. 12A.
Figure 12C:
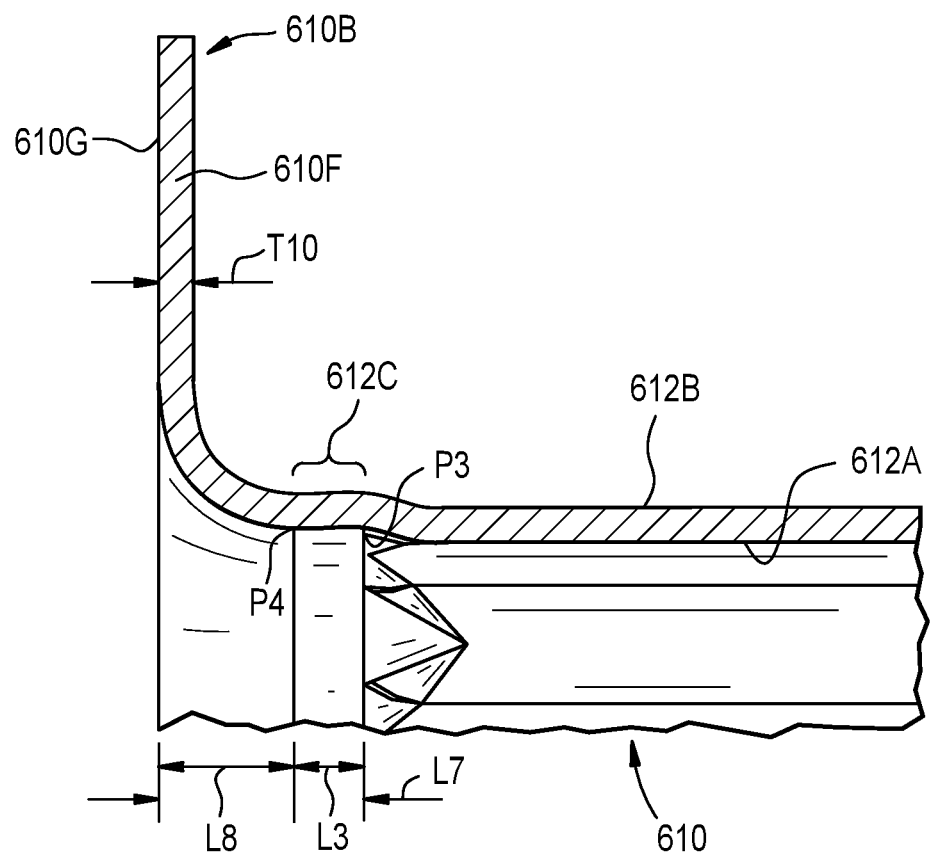
FIG. 12C is an enlarged view of detail 12C of FIG. 12B.

As shown in FIGS. 12A-12C, the sleeve 610 has a stem 612 that has a hybrid cross sectional shape. For example, a cylindrical portion 612C of the cross section of the inner surface 612A and/or the outer surface 612B is circular in shape proximate to and extending from the head portion 610B and the remainder of the stem 612 is fluted similar to the fluting described herein with reference to FIGS. 1-3. As best shown in FIG. 12B, in one embodiment, the stem 612 has an overall axial length L (of the outside surface 612B and/or the inside surface 612A) and the cylindrical portion 612C has a length L3 that is 5 to 10 percent of the overall axial length L. In one embodiment, the length L3 is and up to 5 percent of the overall axial length L. In one embodiment not shown in the FIGS., the circular shape of the cylindrical portion 612C extends from the insertion end 610A and/or the head portion 610B. In one embodiment not shown in the FIGS., the circular shape is located between the insertion end 610A and the head portion 610B. The head portion 610B includes a flange 610F that has a thickness T10. Referring to FIG. 12C, the cylindrical portion 612C extends between a point P3 and P4. The point P3 is located a length L7 from an axial surface 610G of the flange 610F. The point P4 is located a length L8 from the axial surface 610G of the flange 610F. In one embodiment, the axial length L3 is about 300 percent of the thickness T10. In one embodiment, the axial length L3 is about 250 percent to about 350 percent of the thickness T10. In one embodiment the length L8 is about 600 percent of the thickness T10. In one embodiment the length L8 is about 550 percent to about 650 percent of the thickness T10. In one embodiment, the length L7 is about 900 percent of the thickness T10. In one embodiment, the length L7 is about 850 percent to about 950 percent of the thickness T10.

The sleeve 12' shown in FIGS. 4, 5, 7, 8A and 8B is similar to the sleeve 12 shown in FIGS. 1-3, therefore similar elements are marked with the same element numbers followed by a prime (') designation. The sleeve 10' has a hollow elongate stem 12' extending axially parallel to a central longitudinal axis A, between an insertion end 10A' and a head portion 10B'. The elongate stem 12' has an inside surface 12A' and an outside surface 12B'. The sleeve 10' has a stem 12' which as the same cross sectional configuration shown in FIG. 6A. In one embodiment, the sleeve 10' has a stem 12' with the fluted cross sectional configuration shown in FIG. 9. The sleeve 10' is configured for insertion, insertion end 10A' first, into a hole or bore in a substrate (e.g., a substrate in an aircraft such as a panel made of a composite material).

Figure 7:
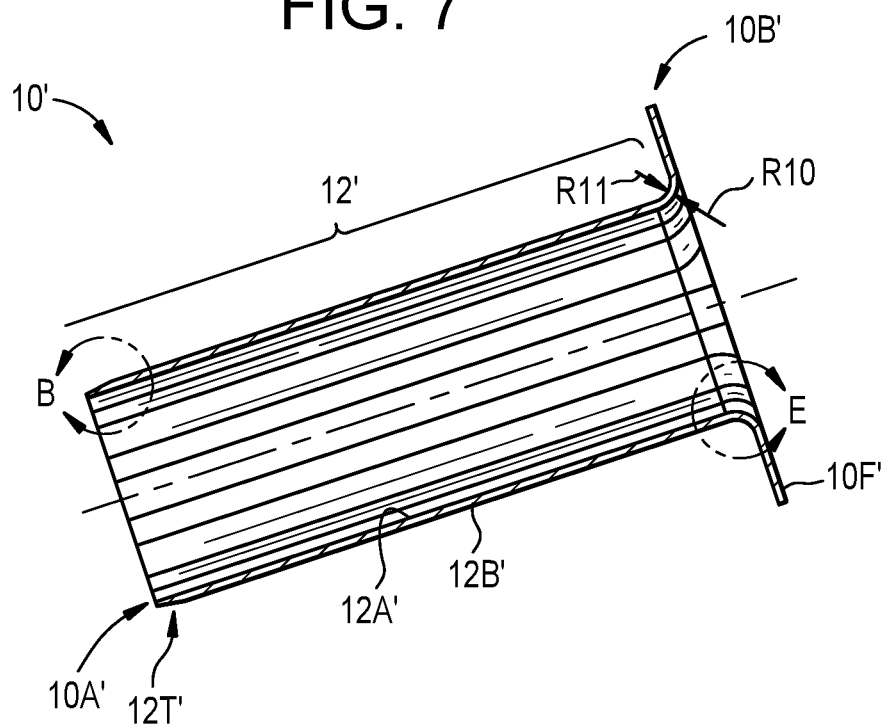
FIG. 7 is an axial cross sectional view taken across section 7-7 of FIGS. 5 and 6.
Figure 8A:
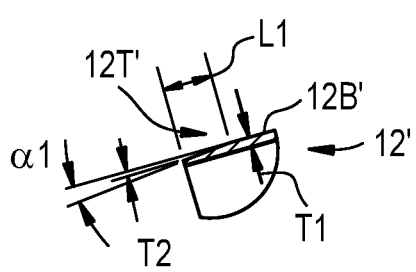
FIG. 8A is an enlarged view of the taper of detail B of FIG. 7.

As shown in FIGS. 4, 5, 7 and 8A, the outside surface 12B' of the stem 12' has a radially inward taper 12T' extending axially toward the insertion end 10A'. As best shown in FIG. 8A, the radially inward taper 12T' extends 360 degrees circumferential around the outside surface 12B' and is inclined at an angle α1 measured relative to the outside surface 12B' and tapering radially inward towards the insertion end 10A'. The taper has an axial length L1 and extends radially inward a depth T2. In one embodiment, the angle α1 is about 4.5 to 5.5 degrees. In one embodiment, the angle α1 is about 5 to 10 degrees. In the depicted embodiment, the angle α1 is about 5.25 degrees. In one embodiment, the length L1 is about 0.050 to 0.100 inches. In one embodiment, the length L1 is about 5 to 7 percent of the overall length L of the stem 12'.

As shown in FIG. 7, in one embodiment, there is an arcuate radius R10 extending between the stem 12' the head portion 10B', on the inside surface 12A'. As shown in FIG. 7, in one embodiment, there is an arcuate radius R11 extending between the stem 12 the head portion 10B', on the outside surface 12B'.

Figure 8B:
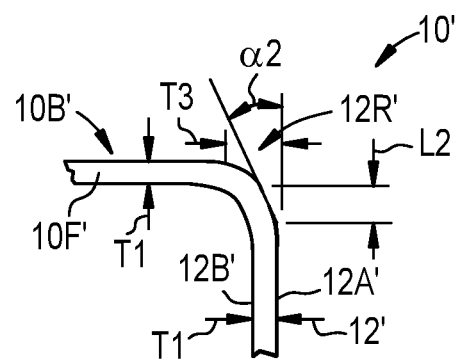
FIG. 8B is an enlarged view of a taper embodiment that may be employed at detail E of FIG. 7.

While the arcuate radii R10 and R11 are shown and described, the present invention is not limited in this regard, as other transitional configurations between the stem 12' and the head portion 10B' may be employed. For example, as shown in FIG. 8B, inside surface 12A' of the stem 10' has a radially outward taper 12R' that extends axially toward the head portion 10B'. As best shown in FIG. 8B, the taper 12R' extends 360 degrees circumferential around the inside surface 12A' and is inclined at an angle α2 measured relative to the inside surface 12A' and tapering radially outward towards the head portion 10B'. The taper 12R' has an axial length L2 and extends radially outward a depth T3. In one embodiment, the angle α2 is about 20 to 30 degrees. In one embodiment, the angle α2 is about 4.5 to 5.5 degrees. In one embodiment, the length L2 is about 5 to 7 percent of the overall length L of the stem 12'. In the depicted embodiment, the length L2 is between 0.050 and 0.100 inches.

Figure 19A:
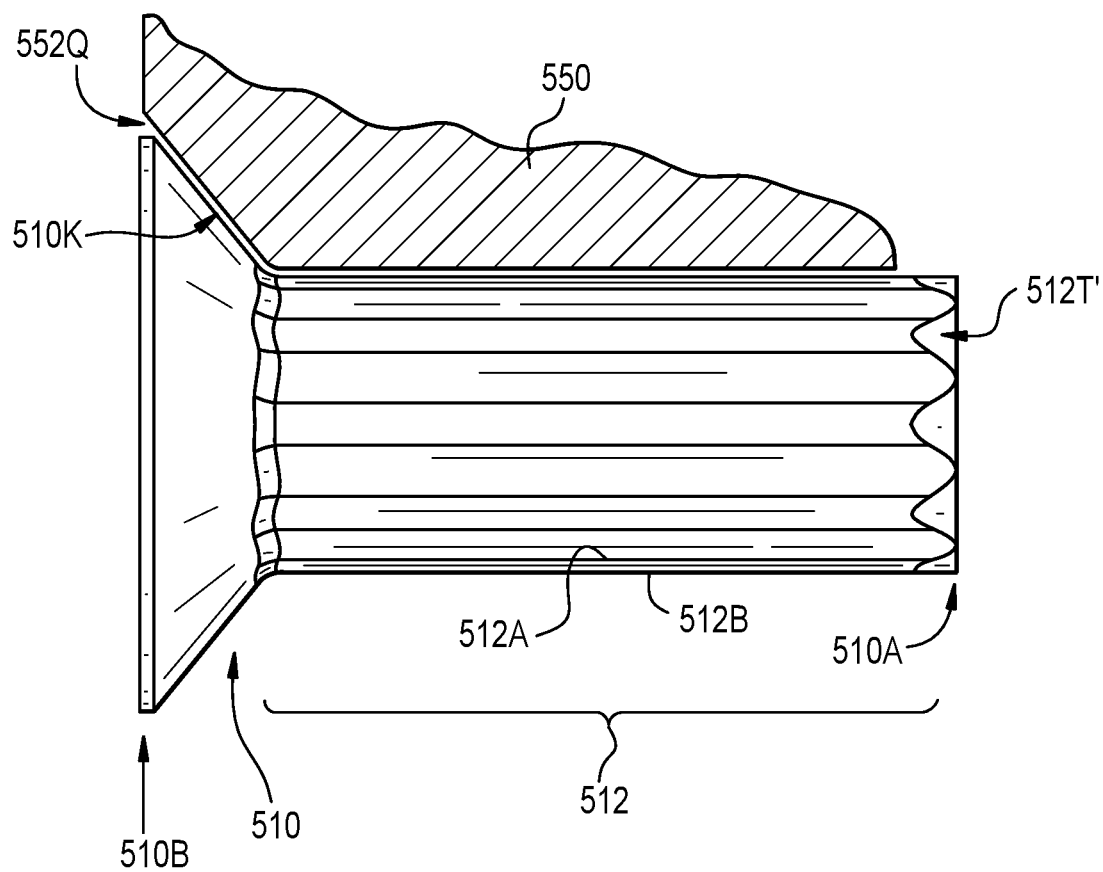
FIG. 19A is a front view of a sleeve having a tapered head profile for use in countersunk bores.
Figure 19B:
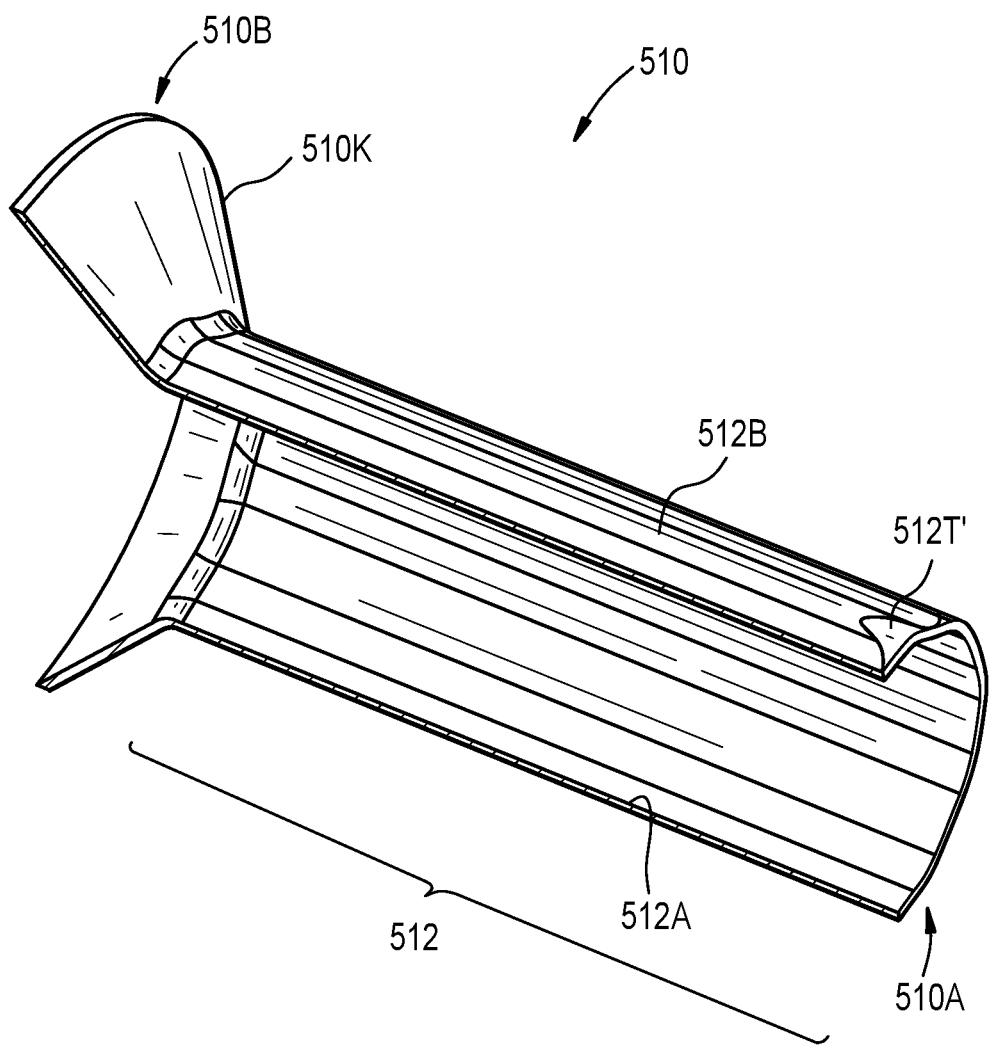
FIG. 19B is a partial cross sectional perspective view of the sleeve of FIG. 19A.
Figure 19C:
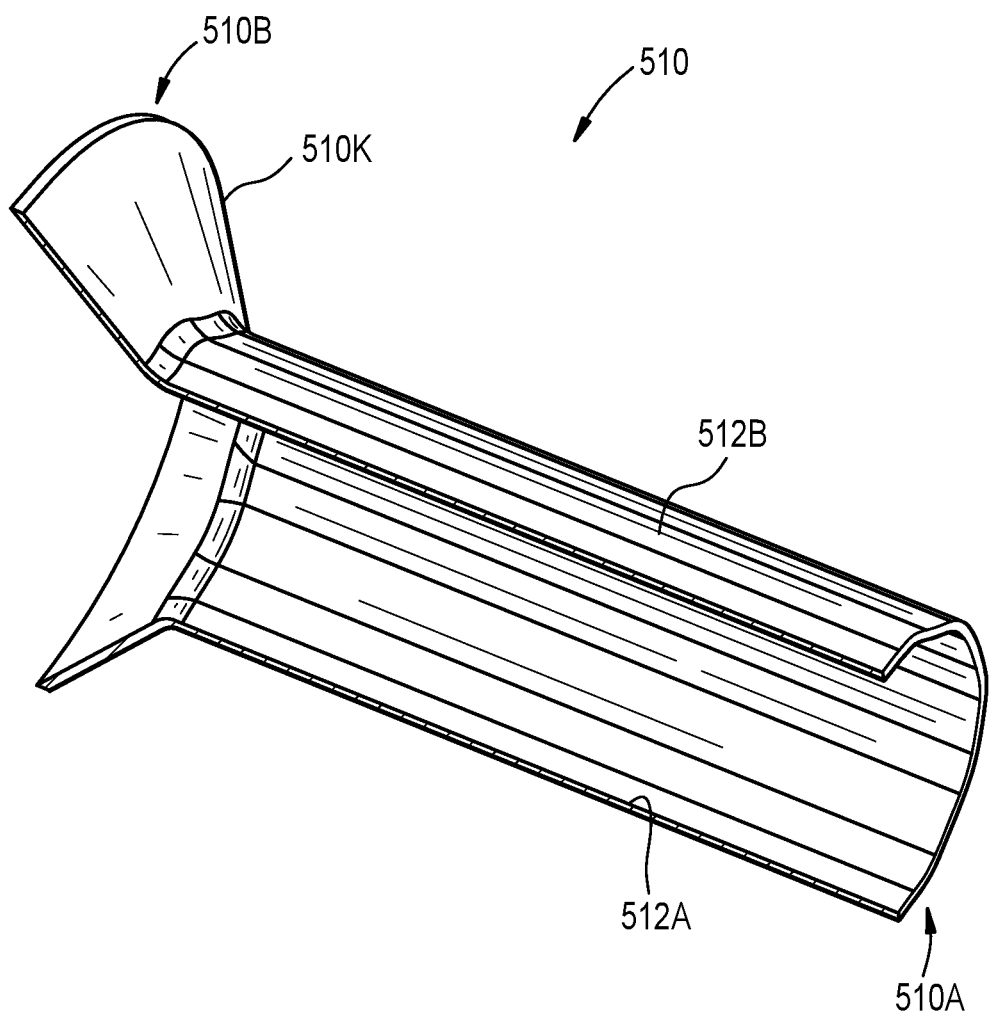
FIG. 19C is a partial cross sectional perspective view of another embodiment of a sleeve having a tapered head profile for use in countersunk bores.
Figure 19D:
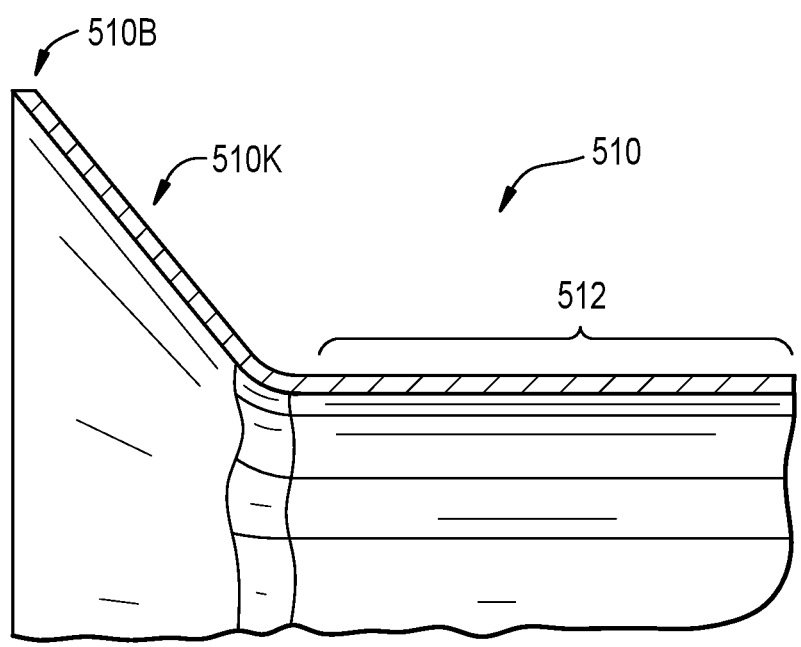
FIG. 19D is a partial cross sectional enlarged view of the sleeve of FIG. 19A.

As shown in FIGS. 1-3, the head portion 10B of the sleeve 10 includes a flange 10F extending radially outward from the stem 12. In one embodiment, the head portion 10B is configured in a flat shape, generally perpendicular to the stem 12. While the head portion is shown and described as being a flange 10F and/or a flat shape, the present invention is not limited in this regard, as other configurations may be employed, including but not limited to a sleeve 510 having a head portion 510B that has conical tapered shape 510K suitable for use in a countersunk hole 552Q in a substrate 550 as shown, for example, in FIGS. 19A-D. As shown in FIGS. 19A and 19B the stem 12 also includes a radially inward taper 512T' proximate the insertion end 510A, similar to the radially inward taper 12T' shown and described with reference to FIG. 5.

In one embodiment, the sleeves 10, 410, 510 are manufactured from an electrically conductive material, such as a stainless steel, austenitic stainless steel, A286 CRES and AMS 5525. Employing an electrically conductive material for the sleeve 10, 410, 510 has utility in providing electrical communication through the sleeve 10, 410, 510 to the substrate that the sleeve is inserted in during instances of lightning surge flow through aircraft structure, thereby mitigating electrical arcing and protecting hardware. This also allows for a means of static electricity to dissipate through the sleeve 10, 410, 510 to the substrate without the need of a ground strap.

As shown in FIGS. 13-17, the present invention includes a method for assembling the interference fastener system 99 in a substrate 50. The interference fastener system includes the sleeve 10, 410, 510, a bolt 80 and a nut 90, as shown in FIG. 17. As shown in FIG. 13, in an initial step of the assembly, the sleeve 10 is slid into the bore 52 of the substrate 50 without any lubrication thereon and with unsubstantial frictional resistance. For example, as shown in FIG. 13, the insertion end 10A of the sleeve 10 is slid into the entry end 52A of the bore 52 until the flange 10F abuts the substrate proximate the entry end 52A of the bore 52 and such that the insertion end 10A is located a distance D15 from the opposite end 52B of the bore 52. During the initial step of assembly, the gaps 15A-15J are present between the outside surface 12B and the third reference circle R3, defined by the interior surface 54 of the bore 52. Referring to FIG. 6B, in one embodiment the third reference circle R3' is slighter greater than second reference circle R2, such that the sleeve 10 slips into the bore 52 unobstructed. In an alternative embodiment, the third reference circle R3 is slightly less than the second reference circle R2 such that there is an interference fit between the sleeve 10 and bore 52. In another embodiment the third reference circle R3 is coincident with the second reference circle R2.

As shown in FIG. 14, a bolt 80 that extends from a first end 80A to a second end 80B is provided. The bolt 80 includes a threaded area 82 (e.g., male threads) that extends axially inward form the second end 80B and terminates between the first end 80A and the second end 80B at a transition area 80T. The bolt 80 includes a head 85 on the first end 80A of the bolt 80. The bolt 80 has a cylindrical expansion area 84 extending from the head 85 and terminating at the transition area 80T.

Figure 15:
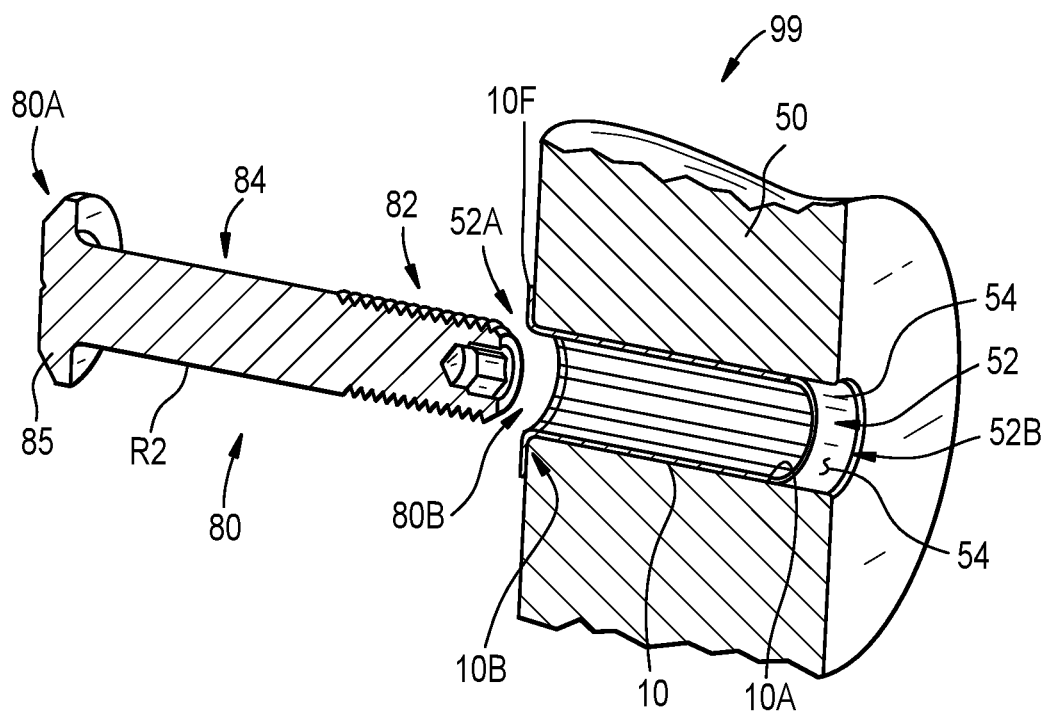
FIG. 15 is a perspective cross sectional view of the sleeve of FIG. 1 installed in a bore of a substrate, with the bolt of FIG. 14 ready to be inserted in the sleeve.
Figure 16:
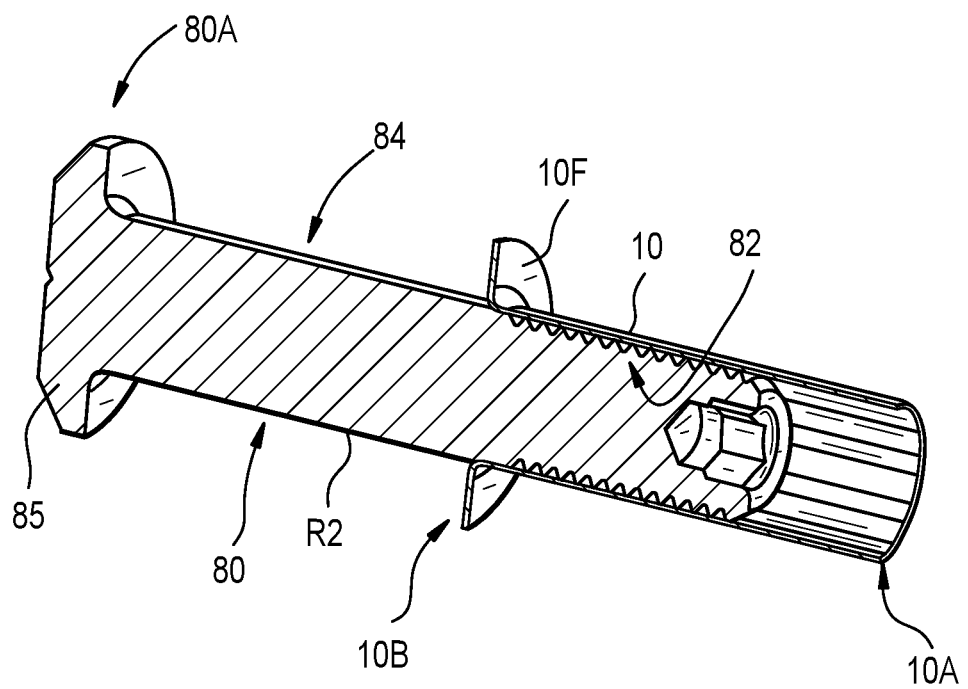
FIG. 16 is a perspective cross sectional view of a threaded portion of the bolt of FIG. 14 inserted into the sleeve of FIG. 1.

As shown in FIGS. 15 and 16, the bolt 80 is positioned for entry into the sleeve 10 and is slid into the sleeve 10 until the threaded area 82 begins to protrude out of the second end 52B of the bore 52. As shown in FIG. 16, a nut 90 that has female threads 92 is threaded onto the threaded area 82 of the bolt 82. The nut 90 is torqued onto the bolt 80 to further draw the expansion area 84 of the bolt 80 into the sleeve 10 and to radially expand the stem 12 into a cylindrical shapes indicated by element number 10' in FIG. 17. The expansion of the sleeve 10 against the interior surface 52 of the bore 52 of the substrate 50 provides the electrical communication through the sleeve 10, 410, 510 to the substrate 50.

Although the present invention has been disclosed and described with reference to certain embodiments thereof, it should be noted that other variations and modifications may be made, and it is intended that the following claims cover the variations and modifications within the true scope of the invention.

What is claimed is:

1. An expandable sleeve for an interference fastener, the sleeve comprising:
   a hollow elongate stem extending axially between an insertion end and a head portion, and the elongate stem having an inside surface and an outside surface, the stem having a uniform cross sectional thickness; and
   wherein at least a portion of the stem has a fluted shape; and
   wherein the stem is radially expandable to create a uniform, cylindrically shaped interference fit in a bore of a substrate.

2. The sleeve of claim 1, wherein:
   the fluted shape comprises at least one of:
   (a) the inside surface being fitted around a first reference circle, at least a portion of a first axial cross section intersecting the first reference circle and at least a portion of the first axial cross section being spaced apart from the first reference circle; and
   (b) the outside surface being fitted within a second reference circle, at least a portion of a second axial cross section intersecting the second reference circle and at least a portion of the second axial cross section being spaced apart from the second reference circle.

3. The sleeve of claim 2, wherein at least one of:
   the inside surface having a first arc length that is greater than a first circumference of the first reference circle; and
   the outside surface having a second arc length that is less than a first circumference of the second reference circle.

4. The sleeve of claim 1, wherein at least a portion of at least one of the outside surface, the inside surface and the fluted shape is polygon shaped.

5. The sleeve of claim 1, wherein at least a portion of at least one of the outside surface, the inside surface and the fluted shape has an arcuate wavy form.

6. The sleeve of claim 1, wherein at least a portion of at least one of the outside surface, the inside surface and the stem is circular in shape.

7. The sleeve of claim 6, wherein the stem has an overall axial length and up to 10 percent of the overall axial length of at least one of the outside surface, the inside surface and the stem has the circular shape.

8. The sleeve of claim 6, wherein the sleeve has an overall axial length and up to 5 percent of the overall axial length of at least one of the outside surface, the inside surface the stem has the circular shape.

9. The sleeve of claim 1, wherein the outside surface comprises a radially inward taper extending axially toward the insertion end.

10. The sleeve of claim 1, wherein at least one of the inside surface, the outside surface and the stem comprises a radially outward taper extending axially toward the head portion.

11. The sleeve of claim 1, wherein the head portion comprises a flange extending radially outward from the stem.

12. The sleeve of claim 11, wherein the flange comprises a flat shape.

13. The sleeve of claim 1, wherein the head portion comprises a tapered shape.

14. The sleeve of claim 1, wherein the sleeve is manufactured from an electrically conductive material.

15. The sleeve of claim 1, wherein the sleeve is manufactured from a stainless steel alloy.

16. The sleeve of claim 1, wherein the stem has a uniform cross sectional thickness.

17. An expandable sleeve for an interference fastener, the sleeve comprising:
   a hollow elongate stem extending axially between an insertion end and a head portion, and the elongate stem having an inside surface and an outside surface, the stem having an overall axial length;
   at least a portion of the stem has a fluted shape; and
   the stem comprises a cylindrical portion proximate to and extending axially toward the head portion.

18. An expandable sleeve for an interference fastener, the sleeve comprising:
   a hollow elongate stem extending axially between an insertion end and a head portion, and the elongate stem having an inside surface and an outside surface, the stem having a uniform cross sectional thickness; and
   wherein the stem comprises stress minimizing means to prevent fracture of the sleeve when the sleeve is expanded in a bore of a substrate; and
   wherein the stem is radially expandable to create a uniform, cylindrically shaped interference fit in a bore of a substrate.

19. The expandable sleeve of claim 18, wherein the hollow elongate stem has an inside surface and an outside surface and the stem comprises at least one of:
   (a) the inside surface being fitted around a first reference circle, at least a portion of a first axial cross section intersecting the first reference circle and at least a portion of the first axial cross section being spaced apart from the first reference circle;
   (b) the outside surface being fitted within a second reference circle, at least a portion of a second axial cross section intersecting the second reference circle and at least a portion of the second axial cross section being spaced apart from the second reference circle; and
   (c) the bore of the substrate defining a third reference circle.

20. The expandable sleeve of claim 19, wherein the third reference circle is greater than the second reference circle.

21. The expandable sleeve of claim 19, wherein the third reference circle is less than the second reference circle.

22. The expandable sleeve of claim 18, wherein the stress minimizing means comprises at least one of:
   a fluted shape on a portion of the stem;
   a cylindrical shape on a portion of the stem proximate to and extending axially toward the head portion; and
   a conical taper on a portion of the stem proximate to and extending axially toward the head portion.

23. An expandable sleeve for an interference fastener, the sleeve comprising:
   a hollow elongate stem extending axially between an insertion end and a head portion, and the elongate stem having an inside surface and an outside surface, the stem having an overall axial length;
   at least a portion of the stem has a cylindrical shape; and
   the stem comprises a radially outward conical taper proximate to and extending axially toward the head portion.

\* \* \* \* \*